United States Patent [19]
Culver

[11] 3,787,686
[45] Jan. 22, 1974

[54] METHOD AND APPARATUS FOR LOGGING WELL BOREHOLES WITH GAMMA RAYS FROM THE INELASTIC SCATTERING OF FAST NEUTRONS

[75] Inventor: Richard B. Culver, Houston, Tex.

[73] Assignee: Dresser Industries, Inc., Dallas, Tex.

[22] Filed: May 24, 1971

[21] Appl. No.: 146,332

[52] U.S. Cl.. 250/83.3 R, 250/83.6 W, 250/83.6 PS
[51] Int. Cl............................................. G01v 5/00
[58] Field of Search.... 250/83.3 R, 83.6 W, 83.6 PS

[56] References Cited
UNITED STATES PATENTS

| | | | |
|---|---|---|---|
| 3,215,836 | 11/1965 | Frey | 250/84.5 |
| 2,996,618 | 8/1961 | Goodman | 250/83.6 W |
| 3,462,600 | 8/1969 | Dewan | 250/83.6 W |
| 3,654,467 | 4/1972 | Tittman | 250/83.6 W |

*Primary Examiner*—James W. Lawrence
*Assistant Examiner*—D. C. Nelms
*Attorney, Agent, or Firm*—William E. Johnson, Jr.

[57] ABSTRACT

A fast neutron source is periodically switched between a pulsed mode and a continuous mode. A first gamma ray detection interval follows the pulsed mode to provide an indication of the capture gamma rays. A second detection interval occurs during the continuous mode to provide an indication of the capture gamma rays plus the gamma rays resulting from the inelastic scattering of fast neutrons. The first indication is subtracted from the second, resulting in an indication solely of the gamma rays from inelastic scattering. The pulses occurring in such intervals are further subjected to energy discrimination which provides information relating to carbon and oxygen content, such information being used with a ratio circuit to provide a carbon/oxygen ratio. In another embodiment, a pair of neutron sources, one pulsed, one continuous, provide analogous results. In still another embodiment, the borehole is first logged with a pulsed source and then later with a continuous source. In yet another embodiment, a shielding, rotating disk having alternate short and long windows is used between an alpha particle source and a neutron emitter to simulate the pulsed and continuous modes.

32 Claims, 14 Drawing Figures

PATENTED JAN 22 1974 3,787,686

*INVENTOR*
RICHARD B. CULVER

William E. Johnson Jr.
*ATTORNEY*

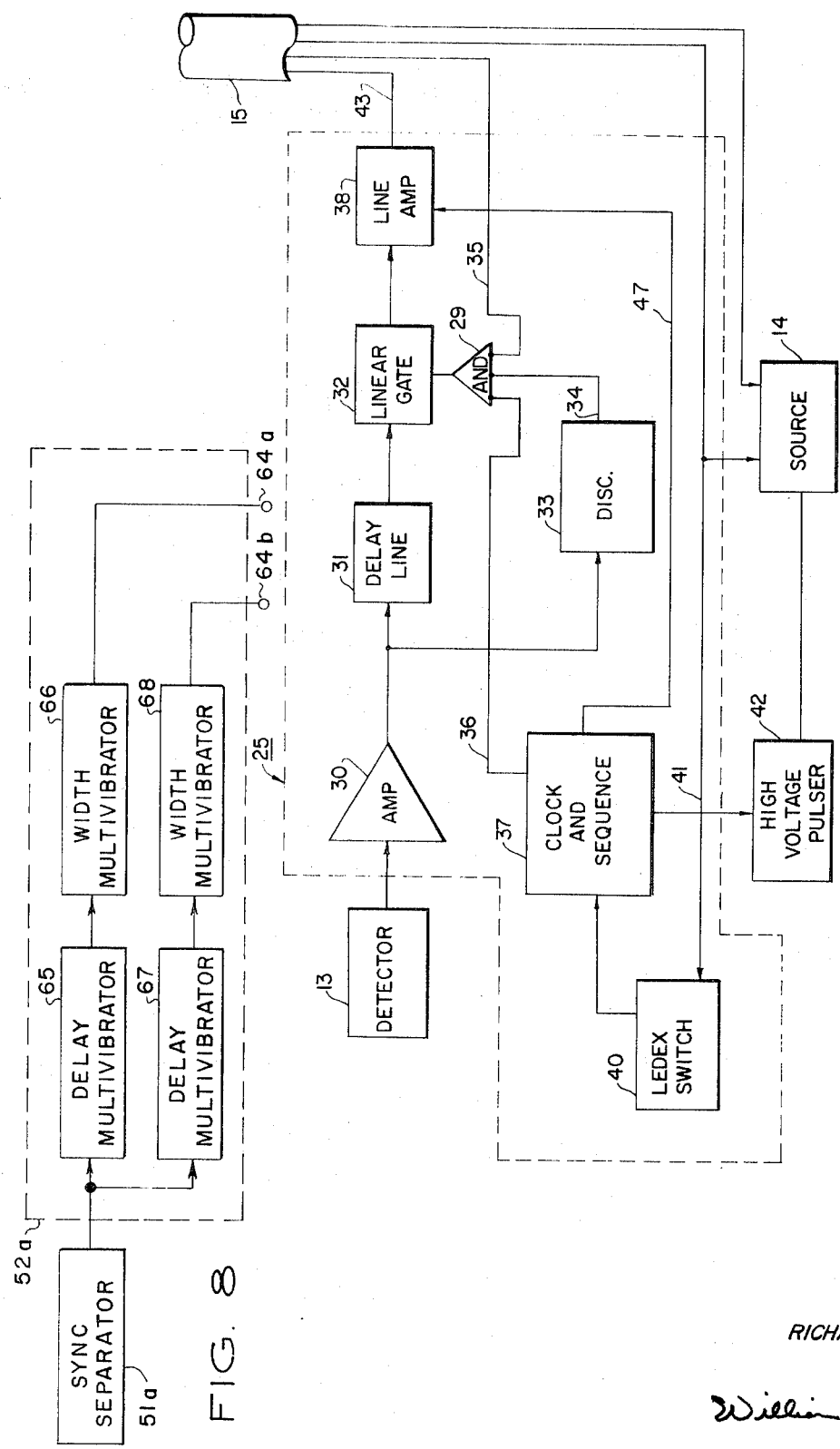

INVENTOR
RICHARD B. CULVER

ATTORNEY

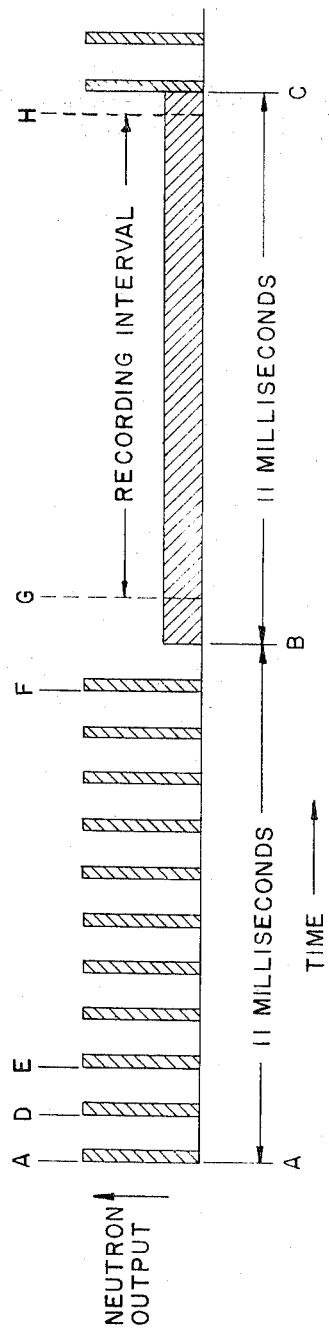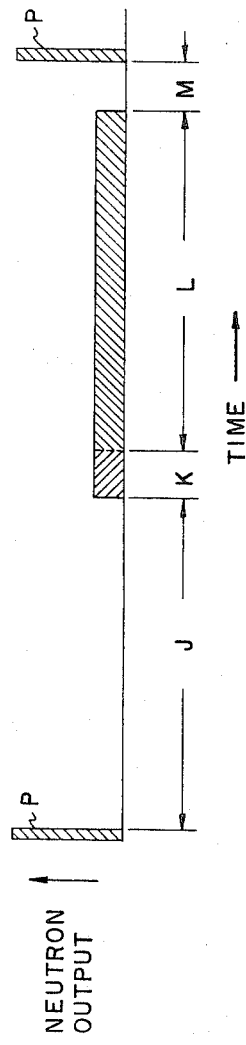

INVENTOR
RICHARD B. CULVER

William E. Johnson Jr
ATTORNEY

METHOD AND APPARATUS FOR LOGGING WELL BOREHOLES WITH GAMMA RAYS FROM THE INELASTIC SCATTERING OF FAST NEUTRONS

BACKGROUND OF THE INVENTION

This invention relates generally to the art of geophysical prospecting and more particularly to the art of radioactivity well logging wherein gamma rays resulting from inelastic scattering of fast neutrons are measured selectively, and the spectral distribution of the gamma rays is determined.

As is well known, the purpose of well logging is to identify the composition of the formations of the earth surrounding a well and their contained fluids. In particular, oil or oil bearing formations are sought to be identified. In one form of radioactivity well logging, fast neutrons from a well logging instrument bombard the formations and various methods have been devised by those in the art of monitoring or detecting the several forms of reactions in the formations resulting from such bombardment.

The four types of fast neutron reactions which predominately occur when earth substances are bombarded are elastic scattering, inelastic scattering, capture and activation. With elastic scattering, the energy lost by the neutrons is conveyed entirely into energy of motion of the struck atom in the formation. In the case of inelastic scattering, part of the energy lost by the neutron is released in the form of gamma rays at the instant of collision. A capture reaction is one in which the thermalized neutron is absorbed into the nucleus of an atom and ceases to exist independently. In most such capture reactions, one or more high energy gamma rays are generated. With an activation reaction, the bombarding neutron transmutes the struck nucleus into an unstable isotope which more or less promptly decays to a stable state.

While recognizing that the four mentioned principal reactions occur, those in the art have found the selective measurement and spectral analysis of gamma rays from inelastic scattering of fast neutrons to be a particularly difficult problem. For example, capture gamma rays from certain nuclei have energy peaks confusingly near to the energy peaks of carbon and oxygen. This has been especially perplexing because inelastic scattering is generally acknowledged to be the only reaction which can be employed to detect and assay carbon.

One system for detecting carbon involves a pulsed neutron source wherein the source is periodicaly actuated for intervals of about 5 microseconds during which the spectrum of gamma rays is analyzed to selectively detect the carbon gamma rays (4.4 mev). Other elements, for example, oxygen, also produce characteristic gamma rays, and in particular, it is desirable to obtain the ratio of carbon to oxygen since this parameter is sensitive to oil saturation while being insensitive to neutron source intensity variations.

However, the measuring interval with the 5 microsecond neutron pulse is so short and the duty cycle so low that the accumulation of data has been found to be prohibitively slow. In principle, the problem could be overcome by increasing the rate of gamma ray production by increasing the output intensity of the neutron source. However, this generally causes the scintillation counter systems to malfunction, since pulses pile up and overlap with a resulting deterioration of spectral resolution.

It is therefore the primary object of this invention to provide a new and improved method and apparatus for providing a spectral analysis of gamma rays from inelastic scattering of fast neutrons;

It is another object of the invention to provide a new and improved method and apparatus for monitoring inelastic scattering of fast neutrons;

It is yet another object of the invention to provide a new and improved method and apparatus for performing a radioactivity well survey which is substantially unaffected by activation or capture gamma rays; and It is still another object of the invention to provide a new and improved method and apparatus for providing a measurement of the ratio of carbon to oxygen in the formations surrounding an earth borehole with respect to depth in the borehole.

SUMMARY OF THE INVENTION

The objects of the invention are accomplished, broadly, by method and apparatus which perform a first measurement with a pulsed neutron source and a detector, which performs a second measurement with a steady state neutron source an a detector, and which provides a difference between the two measurements to indicate the gamma rays due to inelastic scattering of fast neutrons. In addition, energy discrimination provides spectral analysis of the detected gamma radiation whereby various ratio determinations can be made.

These and other objects, features and advantages of the invention will become apparent to those skilled in the art from the following detailed description, when considered with the accompanying drawing, in which:

FIG. 2 is a block diagram of the sub-surface electronics carried within the well logging instrument according to the invention;

Figure 5:
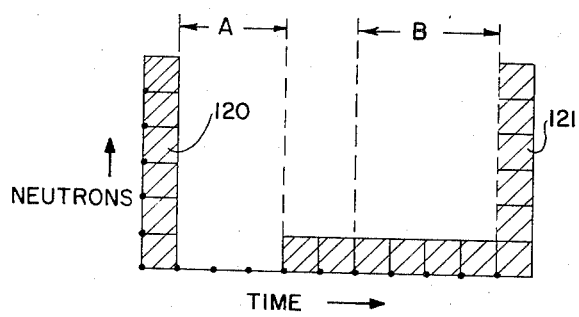
FIG. 5 is a comparative graph of the number of neutrons emitted from a pulsed neutron source and the number of neutrons emitted from a continuous neutron source, each such number of neutrons being plotted versus time.
Figure 4:
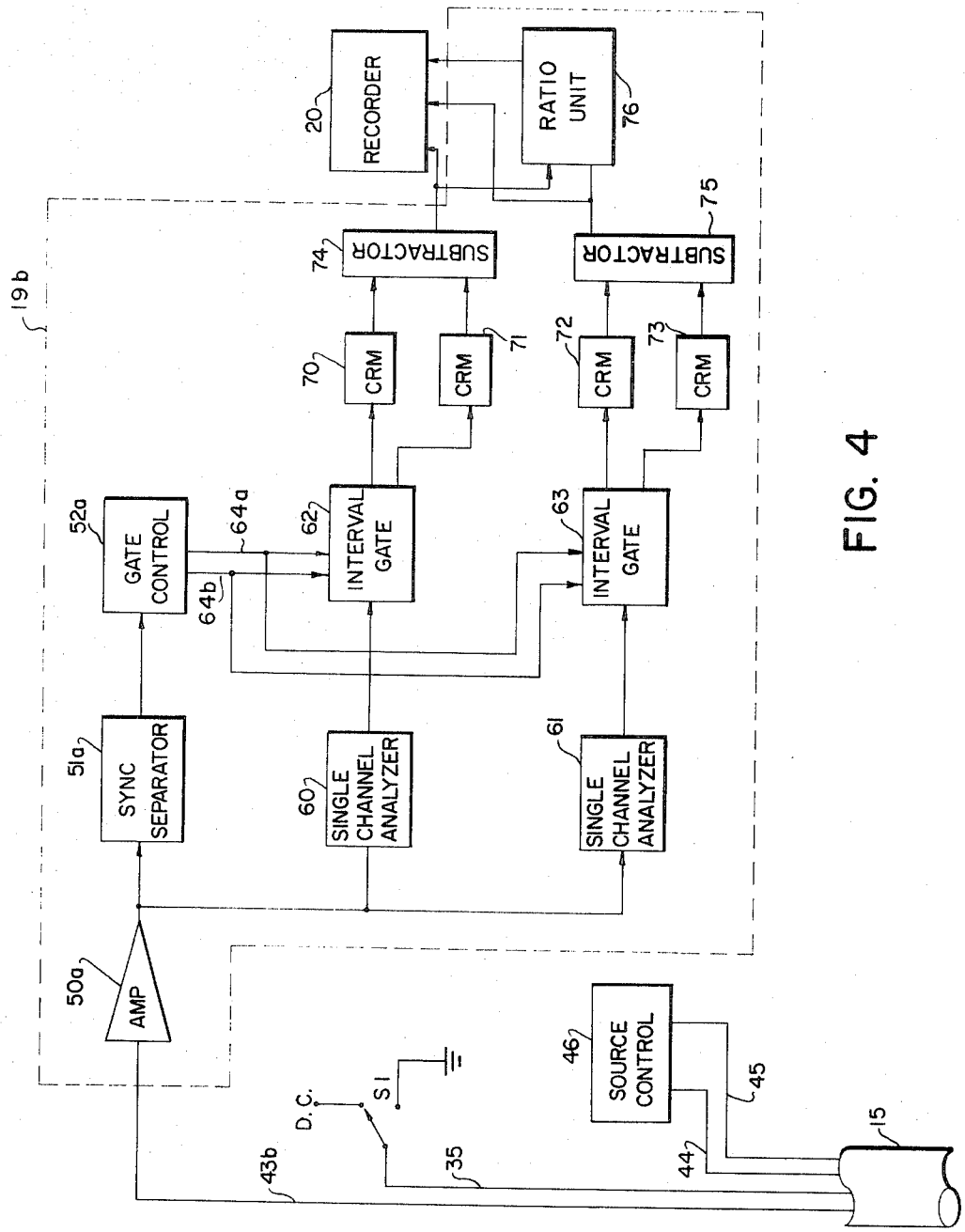
FIG. 4 is a block diagram of another portion of the surface electronics according to the invention.
Figure 5C:
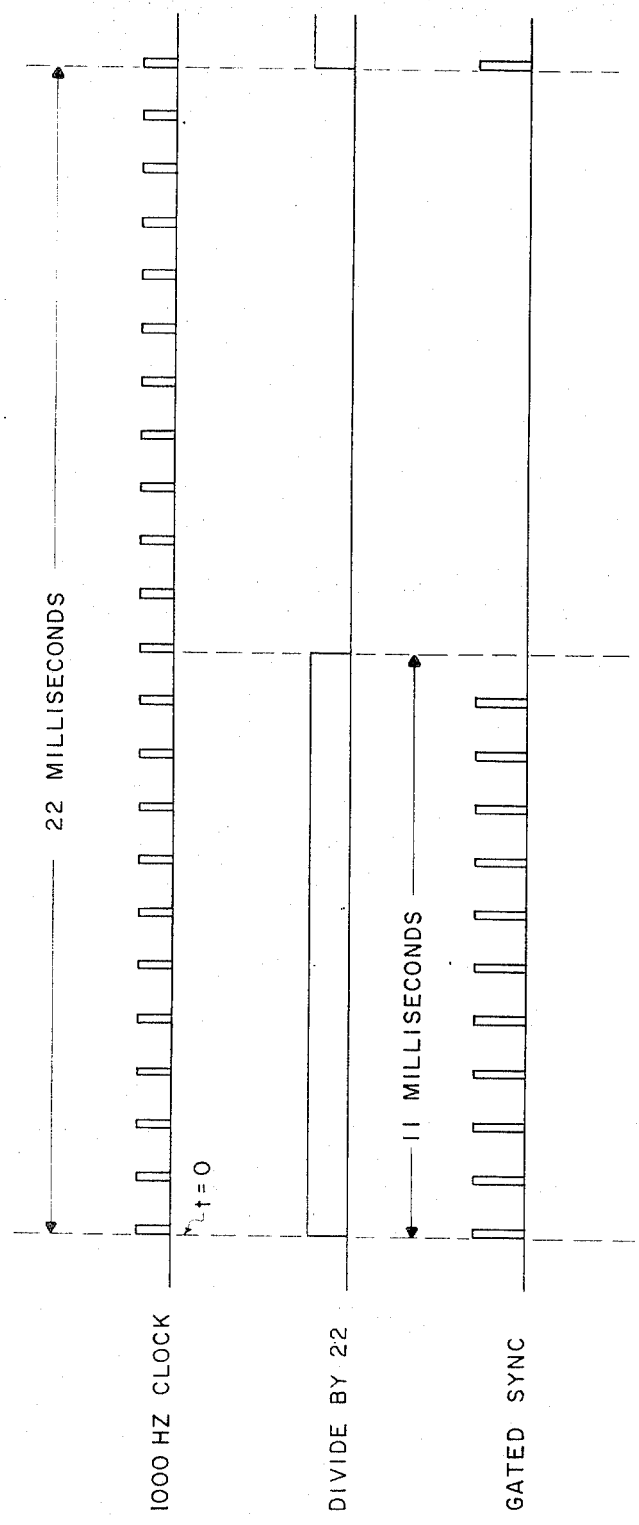
FIG. 5A is a comparative graph of the number of neutrons emitted from a pulsed neutron source and the number of neutrons emitted from a continuous neutron source, each such number of neutrons being plotted versus time in an alternative embodiment of the invention.
FIG. 5B is a comparative graph of the number of neutrons emitted from a pulsed neutron source and the number of neutrons emitted from a continuous source in another embodiment of the invention.
Figure 5D:
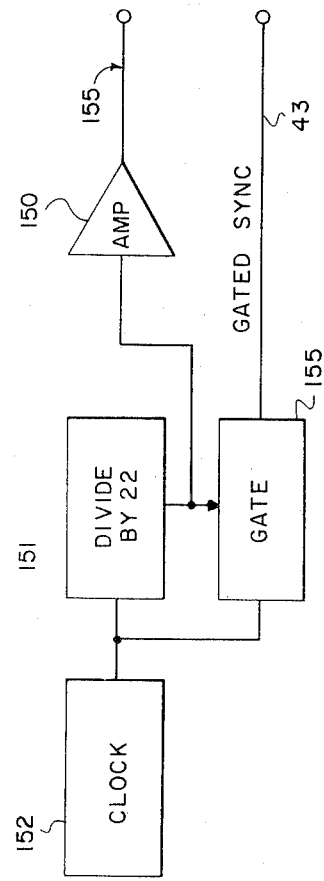
Figure 6:
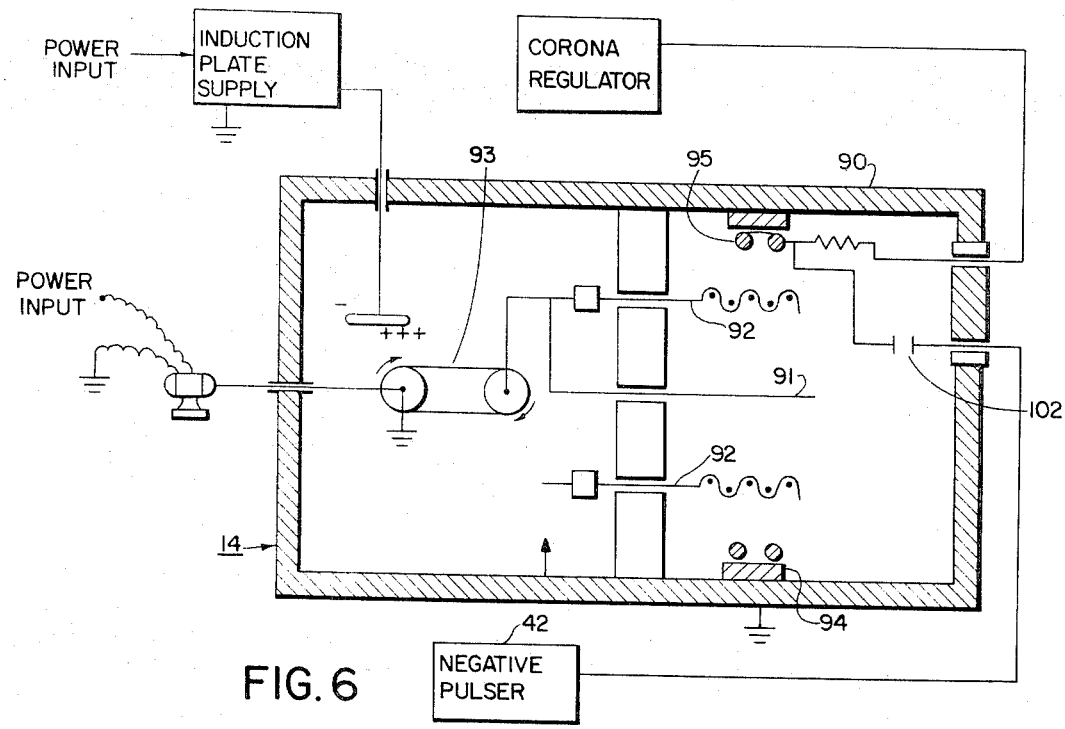
Figure 7:
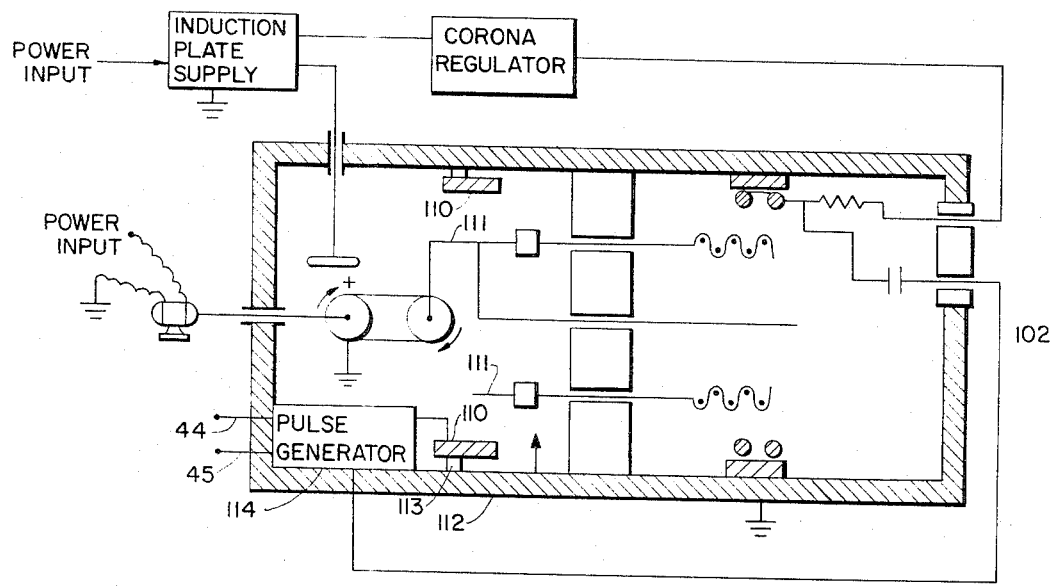

FIG. 5C ilustrates graphically the characteristic electrical signals within the circuitry of FIG. 5D;

FIG. 5D is a block diagram of an alternative circuit embodying the present invention;

FIG. 6 is a schematic diagram of a neutron source for use in the system according to the present invention;

FIG. 7 is a schematic diagram of a modified version of the neutron source of FIG. 6 according to the present invention; and FIG. 8 is a schematic diagram showing in greater detail the gate control circuit of FIG. 4.

Figure 1:
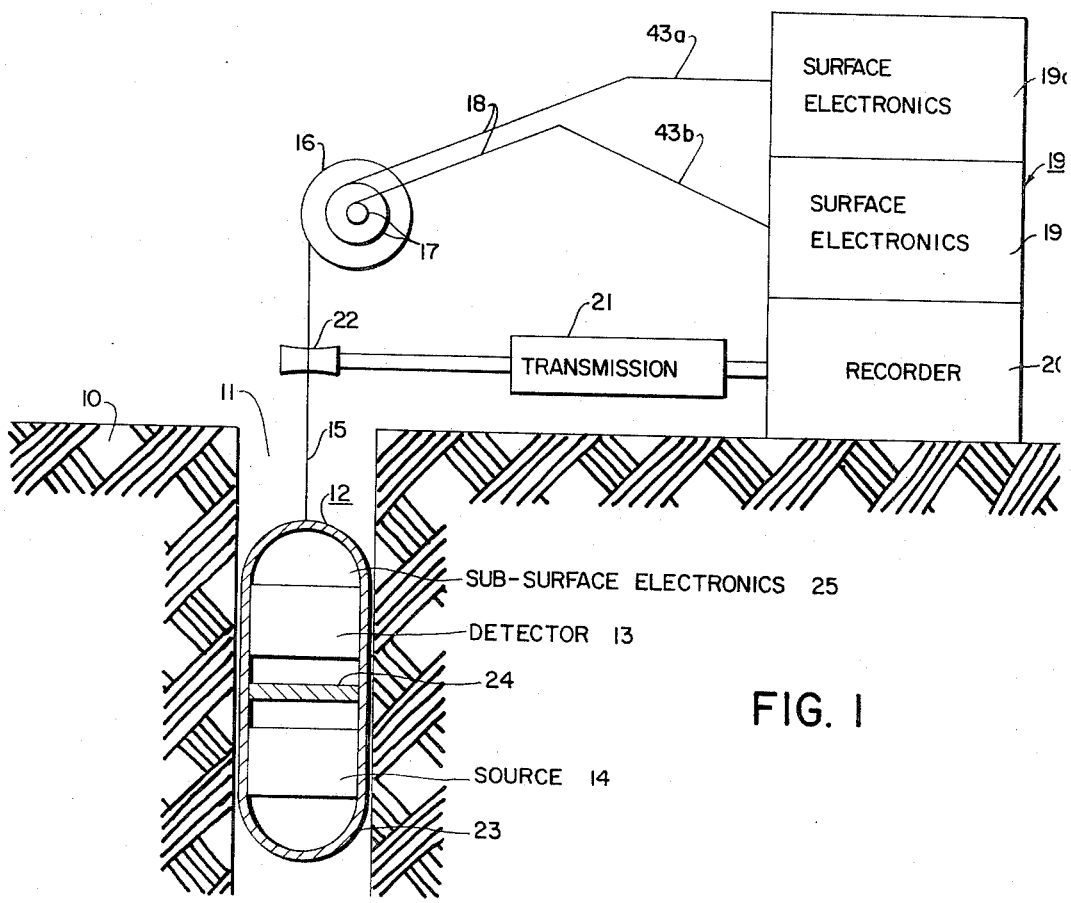
FIG. 1 is a diagrammatic, side elevational view of a radioactivity well logging operation according to the invention.

Referring to the drawings in detail, particularly FIG. 1, there is illustrated schematically a radioactivity well surveying operation in which a portion of the earth 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on or unwound from drum 16 is raising and lowering the instrument 12 to traverse the well.

In making a radioactivity log of a well, instrument 12 is caused to traverse the well. Thereby neutrons from source 14 irradiate the formations surrounding the borehole and radiations influenced by the formations are detected by detecting system 13. The resultant signal is sent to the surface through cable 15. Through slip rings 17 and brushes 18 on the end of the drum, the signal may be conducted to the surface electronics 19, where such signals are processed and then recorded on the recorder 20 as explained in more detail hereinafter. Recorder 20 is driven through a transmission 21 by measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. It is also to be understood that the instrument housing 23 will be constructed to withstand the pressures and mechanical and thermal abuses encountered in logging a deep well and provide adequate space within it to house the necessary apparatus and permit the transmission of radiation through it.

It is desirable to interpose between the neutron source 14 and detector 13 a neutron absorbing shield 24 which may be, for example, tungsten, copper or a hydrogenous material such as paraffin or a combination of such materials.

A sub surface electronics section 25, shown in more detail in FIG. 2, is also located within the borehole instrument 12.

Referring now to FIG. 2, there is illustrated in block diagram the subsurface electronics section 25, as connected to the detector 13. The detector 13 is a scintillation counter arranged for gamma ray spectral analysis in accordance with prior art. In a preferred embodiment, it is a NaI (Tl) crystal having a 2-inch diameter with a 3-inch length, such crystal being coupled to Model No. 4518 photomultiplier tube available from the Radio Corporation of America. Such a crystal-photomultiplier combination may have a resolution of 7.5 to 8.5 percent for the 660 Kev cesium 137 peak. The detector is mounted in a dewar flask or is otherwise protected from high temperatures encountered in boreholes. The output of the detector 13 combination is coupled into an amplifier 30 within the sub-surface electronics section 25. The output of amplifier 30 is coupled through a 400 nanosecond delay line 31 to a linear AND gate 32, and is also coupled into a discriminator 33. This discriminator is used to remove pulses having amplitude below a selectable threshold value which might otherwise cause "pile up" on the transmission line through the cable 15 to the surface. A setting of 400 Kev is suitable. The discriminator 33 output on conductor 34 is AND gated in the AND gate 29 with either a DC voltage from the surface on conductor 35 or with a voltage pulse on conductor 36 from the clock and sequence circuit 37 as determined by the switch S1 in FIG. 3 and by the clock and sequence circuitry 37 of FIG. 2. The output of the AND gate 29 gates the linear gate 32.

Since the gate 32 is of the "linear" variety, as opposed to a "logical" gate, it output approximates very closely at least one of its inputs, which in this example is the delayed series of detected pulses from the delay line 31. The detector pulses, from the amplifier 30 nominally each have a width of 1.2 microseconds. The discriminator output pulses nominally each have a width of 1.8 microseconds. Thus, by using the 400 nanosecond delay (delay line 31), the linear gate 32 is opened by the AND gate 29 to receive the detector pulse from the delay line before a pulse reaches the gate 32 and closed after its departure. This assumes of course, that the detector pulse has an amplitude indicative of a gamma ray with energy greater than 400 Kev and that the discriminator output has been AND gated as previously described, such as from the surface or from the clock and sequence circuit 37.

The output of the linear gate 32 is connected to an integrating amplifier 38 for amplification and transmission to the surface through the cable 15. The reason for using an integrating amplifier is to slightly stretch the pulses, for example, out to about 3 microseconds long. However, depending on cable length and high frequency response, each pulse becomes about 12 microseconds long by the time it reaches the surface. This additional stretching of the pulses further necessitates the use of the 400 Kev discriminator circuit previously described to reduce the chances of the pulses piling up in the cable 15.

A ledex switch 40, controlled by the conductor 41 in the cable 15 from the surface, selects the operating frequency, viz, either 400 or 1,000 Hz., by controlling the clock and sequence circuitry 37. Thus, the clock and sequence circuitry 37, by action of the ledex switch 40, is seen to control the high voltage pulser 42 used for the neutron source 14 (described in more detail with respect to FIGS. 6 and 7), the AND gate 29 (and hence the linear gate 32) and the line amplifier 38 in determining the operating mode of the system.

During one mode of operation of the system, which may be called the pulsed mode, the clock 37 operates at 1,000 Hz, and a shaped sync pulse is fed to the line amplifier 38 along conductor 47 from the clock 37. The control signals for the AND gate 29 in this mode are the output from the discriminator 33 and a DC voltage from the surface along conductor 35. Thus, all pulses from the detector 13 above the 400 Kev threshold and the sync pulse are amplified and transmitted to the surface. Also, during this mode, the sync pulse actuates a high voltage pulser arranged to cause the neutron output of neutron source 14 to pulse at the clock frequency, i.e., at 1,000 Hz as described in U.S. Pat. No. 3,309,522.

During another mode of operation which may be called the steady state mode, the clock 37 and high voltage pulser 42 are disabled, which as is explained hereinafter, causes the neutron source 14 to emit continuously. In such mode, the AND gate 29 is controlled by the discriminator and a DC voltage on conductor 35 from the surface and all detector pulses above the 400 Kev threshold are transmitted to the surface.

To detect selectively gamma rays due to inelastic scattering of fast neutrons, one of the methods of the prior art is the "pulsed source" method, wherein the source is pulsed at 1,000 Hz and gamma rays produced only during the pulse are selected. Within the clock and sequence circuit 37, the clock pulse drives two cascaded univibrators to produce a 5 microsecond pulse synchronized with the neutron source output pulse. In this mode, the 5 microsecond pulse and the discriminator 33 output control the AND gate 29. The gamma ray spectrum sent to the surface consists of pulses that are above the 400 Kev discriminator level and that occur during the 5 microsecond interval. These pulses are coupled to a multi-channel analyzer and/or single channel analyzers for recording.

However, this prior art method of measuring gamma rays from inelastic scattering is subject to many problems. Therefore, the present new and improved method and apparatus has been developed, referred to hereinafter as the "subtraction method."

The subtraction method in its preferred embodiment comprises independent measurements in each of two portions of a complex cycle wherein the neutron source operates alternately pulsed and steady state. Preferably the source cycle would be as follows: first a very short burst of neutrons, e.g., 5 microseconds, would be emitted followed by a quiescent period sufficiently long that all neutrons would have time to be captured; the detector would be operative during this entire quiescent period. Then the source would begin to emit neutrons at a constant uniform rate. After this emission had persisted for some time, an equilibrium would be established such that the rate of neutron emission would be equal to the rate of neutron capture. At a time such that this equilibrium is established in any medium to be encountered, the detector would be activated and would remain operative for a measurement interval equal to the time duration of the aforementioned quiescent interval. The rate of steady state neutron emission should be just such that during the measurement interval the number of neutrons emitted by the source would be exactly equal to the number emitted during the neutrons burst.

Following this measurement interval there should preferably be an interval during which the source is quiescent. During this latter interval, thermal neutrons decay away so as not to be observed during the succeeding measurement. The "ideal" measurement cycle may be depicted as in FIG. 5A. Following the short neutron pulse, for example, of 5 microseconds duration, the quiescent period J commences and lasts for approximately 1,000–2,000 microseconds. The neutron source then begins to emit neutrons at a constant level. During the period K, the neutron emission and capture rates come to equilibrium. The period L, which should be of the same duration as J, is used for the steady state detection interval. Although not drawn to scale, it should be appreciated that the number of neutrons emitted during the period L should be equal to the number of neutrons emitted during the pulse P. The interval K should be equal to the second quiescent interval M, and each preferably of 400–1,000 microseconds in duration. Whereas FIG. 5A represents the preferred or "ideal" measurement cycle, a less elaborate or simplified cycle has been found to give satisfactory results.

A portion of the simplified subtraction method operates as follows: referring again to FIG. 2, the ledex switch 40 is caused to make the clock run at 400 Hz; the sync pulse is delivered to the line amplifier 38; and the source 14 is pulsed at the clock frequency of 400 Hz. The AND gate 29 is controlled by the discriminator 33 and the DC voltage on the conductor 35 from the surface. All pulses above the discriminator threshold (400 Kev) are sent to the surface along with the sync pulse from the clock and sequence circuitry 37. As will be explained in more detail with respect to FIGS. 5, 6 and 7, the source 14 is arranged to deliver a burst of neutrons every 2,500 microseconds followed by a quiescent period of from 1,000 to 1,200 microseconds. At the end of the quiescent period, the source 14 is arranged to emit neutrons at a steady state rate, i.e., continuously, such that substantially the same number of neutrons are emitted during the remaining portion of the cycle prior to the next neutron burst, as are emitted during each neutron burst. That is, the average number of neutrons emitted during the pulses should be the same as the number emitted during the steady state intervals.

Figure 3:
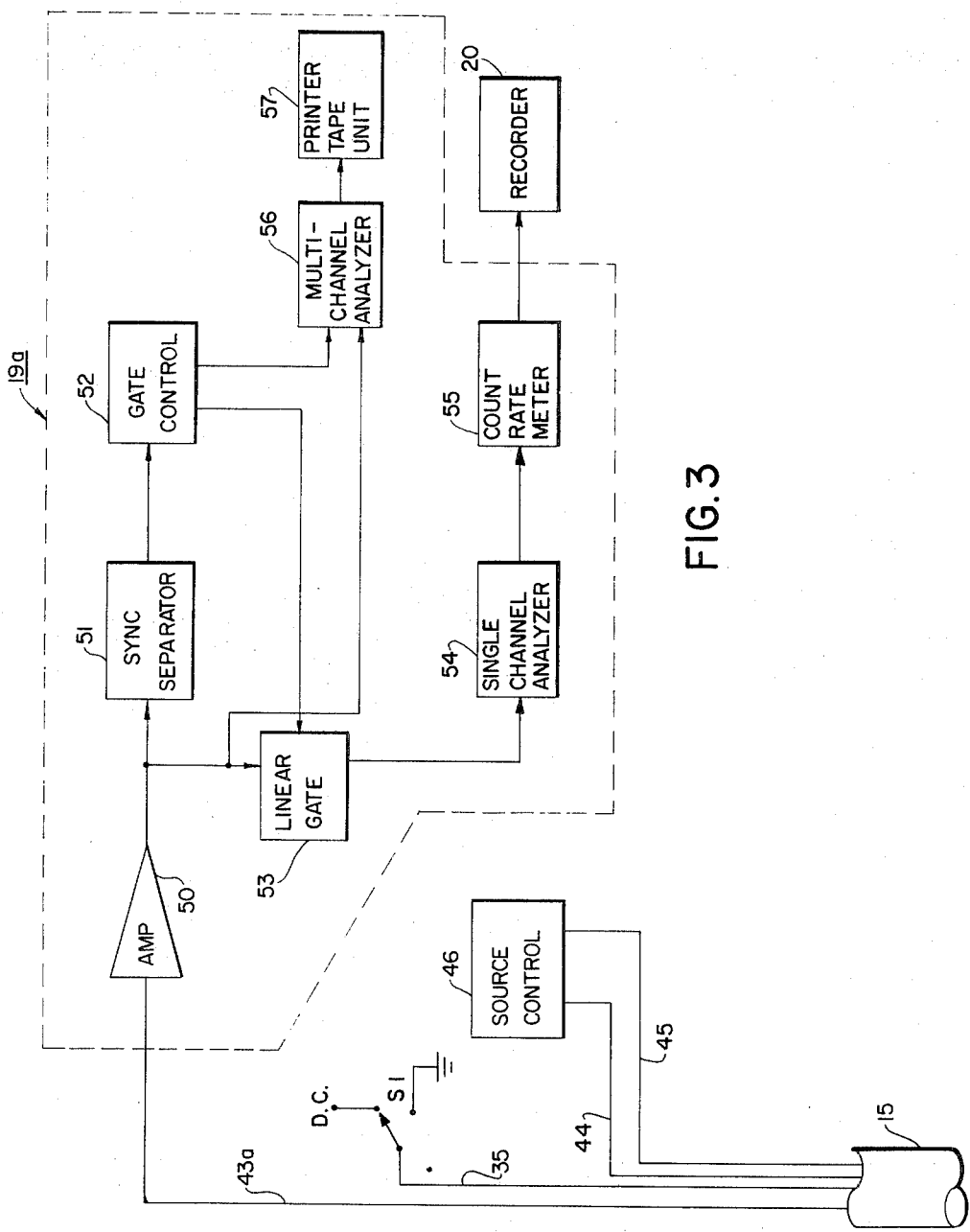
FIG. 3 is a block diagram of a portion of the surface electronics according to the invention.

Referring now to FIG. 3, a porton 19a of the surface electronics 19 is illustrated for purposes of using the system for various logging operations. As shown in FIG. 1, the conductors 43a and 43b, electrically the same as conductor 43 in FIG. 2, are connected to the brushes 18 off the slip rings 17. In FIG. 3, the pulses from conductor 43a are amplified by the amplifier 50, and then coupled into a sync separator circuit 51, the output of which drives a gate control circuit 52. The output pulses from the amplifier 50 are also coupled into a linear gate 53, the output of which is coupled into a single channel analyzer 54, which in turn is coupled into a count rate meter 55. The count rate meter 55 is then connected to the conventional recorder 20.

The gate control circuit 52 is connected to a multi-channel analyzer 56, which has as its input the pulses from the amplifier 50. The multichannel analyzer then drives a printer/tape unit 57. Also shown in FIG. 3, as well as in FIG. 4, is the control circuit 46 for the neutron source 14, the control being handled over the conductors 44 and 45.

In the pulsed mode of operation, the separated sync signal drives a pair of cascaded univibrators within the gate control 52 that determine the time dealy and time width of the signal to control the linear gate 53. Hence, only that portion of the detected pulses from the amplifier 50 falling within a predetermined time interval following the sync pulse will be passed through the linear gate 53 to the single channel analyzer, count rate meter and recorder combination.

In the case of the multichannel analyzer, the gate control circuit 52 can be used to gate the multichannel analyzer 56 directly.

For the steady state mode of operation, the linear gate 53, sync separator 51 and the gate control 52 are bypassed and all pulses from the amplifier 50 are coupled to the single channel analyzer, count rate meter and recorder combination. Also, all pulses from the amplifier 50 are coupled to the multichannel analyzer and printer/tape unit combination.

Figure 3A:
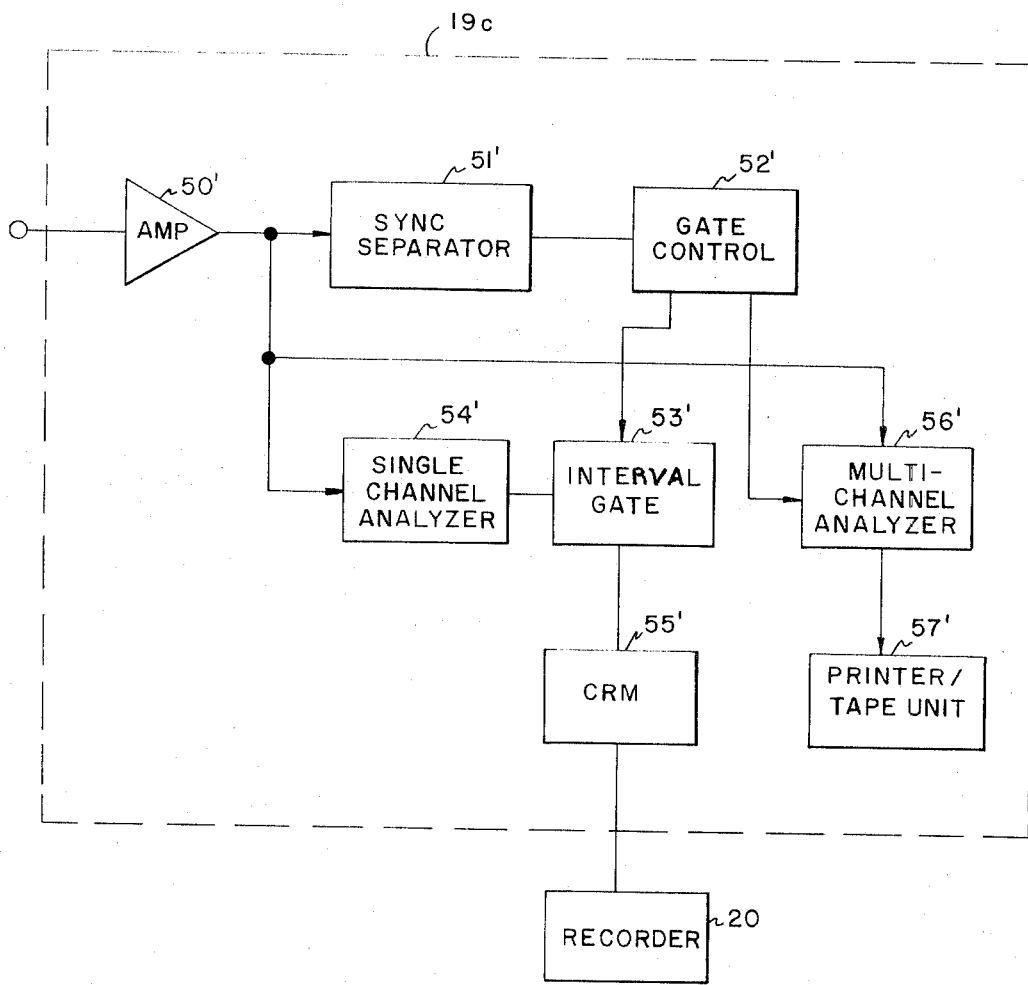
FIG. 3A is a block diagram of an alternative embodiment of the surface electronics according to the invention.

An alternate system is shown in FIG. 3A wherein the desired pulses are separated in a "logical" gate following the single channel analyzer rather than in a "linear" gate preceding the single channel analyzer. The section 19c of the surface electronics is in most respects like that of section 19b of FIG. 3, except the logical interval gate 53' follows the single channel analyzer 54' in FIG. 3A.

Referring now to FIG. 4, the surface electronics section 19b is illustrated in greater detail. The conductor 43b is coupled into an amplifier 50a, the output of which drives a sync separator circuit 51a, a first single channel analyzer 60 and a second single channel analyzer 61. The sync separator 51a triggers the gate control circuit 52a in a manner similar to that described with respect to the circuits 51 and 52 of FIG. 3. The gate control circuit 52a has two pairs of univibrator circuits therein, whereby the delay and pulse width of the gating signals from the gate control 52a can be determined. preferably, the output pulses from gate control 52a, which are connected by conductors 64a and 64b to the interval gates 62 and 63, are of equal duration, about 950 microseconds; one begins immediately after cessation of the burst of neutrons, which in a working embodiment might be from 5 to 100 microseconds after time zero. For purposes of illustration it is satisfactory for this gate to begin at 50 microseconds after the sync pulse and the second at 1,450 microseconds after the sync pulse. The control gate circuit 52a is shown in more detail in FIG. 8, wherein the first pair of multivibrators 65 and 66 are adjusted to form a first interval by creating a gating pulse 950 microseconds long commencing 50 microseconds after the sync pulse, and the second pair of multivibrators 67 and 68 are adjusted to form a second interval by creating a gating pulse 950 microseconds long commencing 1,450 microseconds after the sync pulse.

In operation, the single channel analyzer 60 is set to pass only those pulses produced by gamma rays of 4.4 mev. The interval gate 62 passes all those selected gamma ray pulses occurring within the first interval to the count rate meter 70. Those gamma rays having 4.4 mev energy occurring within the second interval are passed by the interval gate 62 to the count rate meter 71.

In a similar way, the single channel analyzer 61 is set to pass pulses due to gamma rays having an energy of about 6.0 mev. The interval gate 63 separates them into the first and second intervals and passes them to the count rate meters 72 and 73, respectively.

The outputs of the count rate meter circuits 70 and 71 are connected into a subtraction circuit 74, wherein the pulses counted by CRM 70 are subtracted from the pulses counted by the CRM 71. In a similar manner, the subtraction circuit 75 causes the pulses counted by CRM 72 to be subtracted from the pulses counted by the CRM 73. The outputs of the subtractor circuits 74 and 75 are each coupled into a ratio unit 76, as well as each being coupled into the recorder 20 which moves in correlation with depth in the borehole as described with respect to FIG. 1. The ratio unit 76 provides a carbon/oxygen ratio which is also recorded on the recorder 20.

As previously mentioned, one of the main difficulties in measuring the oxygen and carbon gamma rays resulting from inelastic scattering is due to the fact that some capture gamma rays have energies which are very close to those of carbon and oxygen. For example, whereas the carbon and oxygen gamma rays of interest have energy peaks of 4.4 and 6.1 mev, respectively, calcium capture gamma rays have energies of 6.4 mev; iron capture gamma rays have energies of 5.0 mev and also 7.6 mev, to name but a few. However, the applicant has discovered that by using a pulsed neutron source in conjunction with a steady state (continuous) neutron source, the capture gamma rays are eliminated from the calculations.

During the first interval, which commences 50 microseconds after the neutron burst from the pulsed source, the capture gamma rays are measured. During the second interval, which occurs during the steady state condition of the neutron source, the capture gamma rays plus the gamma rays from inelastic scattering are measured. Thus, by subtracting the first interval measurement from the second interval measurement, only the gamma rays from inelastic scattering are counted. Preferably in this type of operation the number of capture gamma rays occurring during the first interval should be equal to the number of capture gamma rays occurring during the second interval. However, if the numbers are not equal, then the length of the respective intervals may be normalized, as for example, by varying one of the detection intervals to result in an equalization of the capture gamma rays for the two intervals.

However, to avoid the need for such normalization of the two intervals, it is highly advantageous to have the number of capture gamma rays in one interval be just equal to the number of capture gamma rays in the other interval. Furthermore, the simplest way to have such an equality of capture gamma rays is to have the same number of fast neutrons radiate the formations in conjuction with the respective intervals.

FIGS. 6 and 7 illustrate a neutron source 14 which provides a means for irradiating the formations with first, a short burst of fast neutrons, followed by a quiescent interval, followed in turn by a steady state emission of fast neutrons at the desired rate, after which the source is again pulsed and the cycle repeated. While FIGS. 6 and 7 are fully described and illustrated in U.S. Pat. No. 3,309,522 to A. H. Youmans et al., issued Mar. 14, 1967, and assigned to the assignee of the present invention, the particular operation of the neutron source as contemplated by the present invention is not described in that patent, and it therefor seems advantageous to further describe its mode of operation.

In brief, the neutron source 14 of FIG. 6 includes an accelerator tube 90 having an anode 91 and a cathode 92 wherein the tube 90 contains an atmosphere of either deuterium or tritium ( or a mixture of both). The source 14 also includes a belt-driven electrostatic generator 93, such as the well-known Van de Graaf high voltage generator. A belt-shaped target 94, generally formed of a thin strip of titanium, and impregnated with either deuterium or tritium, or a mixture of both, is formed on the inside of the neutron source 14 in a manner to encircle the cathode 92 and an anode 91. Between the target 94 and the cathode 92 are found one or more electrodes, generally referred to as the suppressor rings 95.

A pulse generator 42 is connected to the suppressor rings 95 by way of coupling capacitor 102, the capacitor 102 preferably being large in capacitance relative to the interelectrode capacitance between the suppressor rings 95 and the cathode 92, being hereinafter referred to as $C_1$. The pulse generator 42 is adapted to apply a sequence of negative pulses through the capacitor 102 to the suppressor rings 95 at a fixed preselected frequency, or at a rate determined by the surface located control apparatus 46 by way of conductors 44 and 45.

As explained in the aforementioned patent to A. H. Youmans et al., the application of the negative pulse by the generator 42 causes the source 14 to emit a short burst of neutrons. The magnitude of the optimum pulse from the generator for pulsed operation of the source is dependent upon several factors, notably the Van de Graaf current, the desired repetition rate of the source, and the neutron pulse duration of the source. For example, with a Van de Graaf current of 30 microamperes, a 20 microsecond applied negative pulse of between 3,000–4,500 volts from the generator 42 produces an ion current pulse of 20 microseconds duration which will substantially discharge the interelectrode capacitance $C_2$ subsisting between the anode 91 and cathode 92. After a pulse of this type has occurred, no ionization current will appear across the ionization gap until another negative pulse is supplied by the pulse generator 42, or until the electrostatic generator succeeds in "recharging" $C_2$ up to its threshold potential. With an electrostatic generator charging current of 30 microamperes or less, it has been found that for an ion accelerating tube of the type described, this does not occur for about 1,000 microseconds. Thus, by applying a negative pulse every 1,000 microseconds from the generator 42, the source 14 is observed to emit short bursts of fast neutrons every 1,000 microseconds with no neutrons emitted during the interval between pulses.

It will be apparent to those skilled in the art that the various interelectrode capacitances in the neutron source 14, by operation of the electrostatic generator 93, are all relative to each other in magnitude, and may vary in magnitude according to variations in any one or more of such capacitances. Thus, alternative forms of the neutron source depicted in FIG. 6 may be provided by applying "triggering" pulses to one or more of these interelectrode capacitances, other than $C_1$ as hereinbefore described. For example, FIG. 7 shows a variation of the circuitry and system depicted in FIG. 6, wherein an auxiliary electrode 110 is mounted within the electrostatic generator 93, opposite the hollow electrode 111, and near the wall of the electrostatic generator tank. This auxiliary electrode 110 is preferably insulated from the tank 112 (which is at "ground" potential) by an insulator 113 and is connected to a pulse generator 114 which, in turn, is adapted to generate positive pulses for applicaton to the electrode 110 in a manner analogous to the manner previously described for the pulse generator shown in FIG. 6. In FIG. 7, it may be seen that the pulse generator 114 is adapted to supply also a negative trigger pulse to the coupling condenser 102 of the suppressor ring circuit, in the manner shown in FIG. 6. This negative pulse should, of course, be applied simultaneously with the application of the positive pulse to the auxiliary electrode 110. However, the negative pulse need not necessarily be supplied by the pulse generator 114, but may be developed by a separate pulse source.

However, as noted by way of caution in the A. H. Youmans et al. patent, the source 14 as described commences to emit neutrons if the pulses from the generator 42 of FIG. 6 (or generator 114 of FIG. 7) are spaced too far apart timewise.

The present invention makes use of this feature, heretofore considered to be merely an undesirable characteristic.

In operation, especially with the surface electronics 19b of FIG. 4, the system is set to operate at 400 Hz, and the source 14 to thereby emit a short burst of neutrons every 2,500 microseconds. By a proper adjustment of the Van de Graaf charging current, and of the pulse amplitude and width of the pulse from the pulse generator 42 (or pulse generator 114), the source 14 commences to continuously emit fast neutrons at about 1,000 microseconds after the pulse is applied from the generator 42.

This is graphically illustrated in FIG. 5, where the total number of fast neutrons emitted is plotted versus the time cycle of the system. Assume, for example, that the equal time intervals A and B are together equal to 1,900 microseconds, which together with the pulse duration and the interval between A and B amount to about 2,500 microseconds. The beginning of interval A coincides with the conclusion of the pulsing of the source 14, with its concomitant burst 120 of neutrons. The interval B begins after the source 14 begins to continuously emit neutrons at a rate which causes the total number of neutrons emitted during the steady state interval B to equal the number of neutrons emitted in the pulsed burst of neutrons 120. As previously mentioned, if desired, or where necessitated because of the use of a source where the steady state number of neutrons fails to be equal to the number of "pulsed" neutrons, the circuits can be normalized, as, for example, by varying the gate widths in the detection and/or processing circuitry. However, the source 14 as illustrated in FIGS. 6 and 7 generally does not require normalizing circuitry, because of the discharge characteristics of the particular type of source. At 2,500 microseconds, another short burst of neutrons 121 is emitted due to the pulse from the generator 42.

Another cycle is graphically shown in FIGS. 5B and 5C which very nearly approach the ideal cycle of FIG. 5A. The clock pulses, from clock 152 in FIG. 5D, are scaled in a divide-by-22 counter, the output of which gates the sync pulses that from the gate 155 drive the high voltage pulser and the line amplifier. Thus, the source pulses for eleven consecutive clock periods (A, D, E . . . F) and then begins to emit neutrons at a steady state rate for the next 11 clock periods, the steady state emissions beginning at point B about 1,000 milliseconds after the 11th gated pulse as shown in FIGS. 5C and 5B, and lasting to point C. The recording interval lasts from point G to point H.

In FIG. 5D, the gated sync pulses are amplified by the line amplifier 150 and transmitted to the surface via conductor 43. The output from the divide-by-22 circuit 151 is also amplified and transmitted to the surface over conductor 155.

Figure 4A:
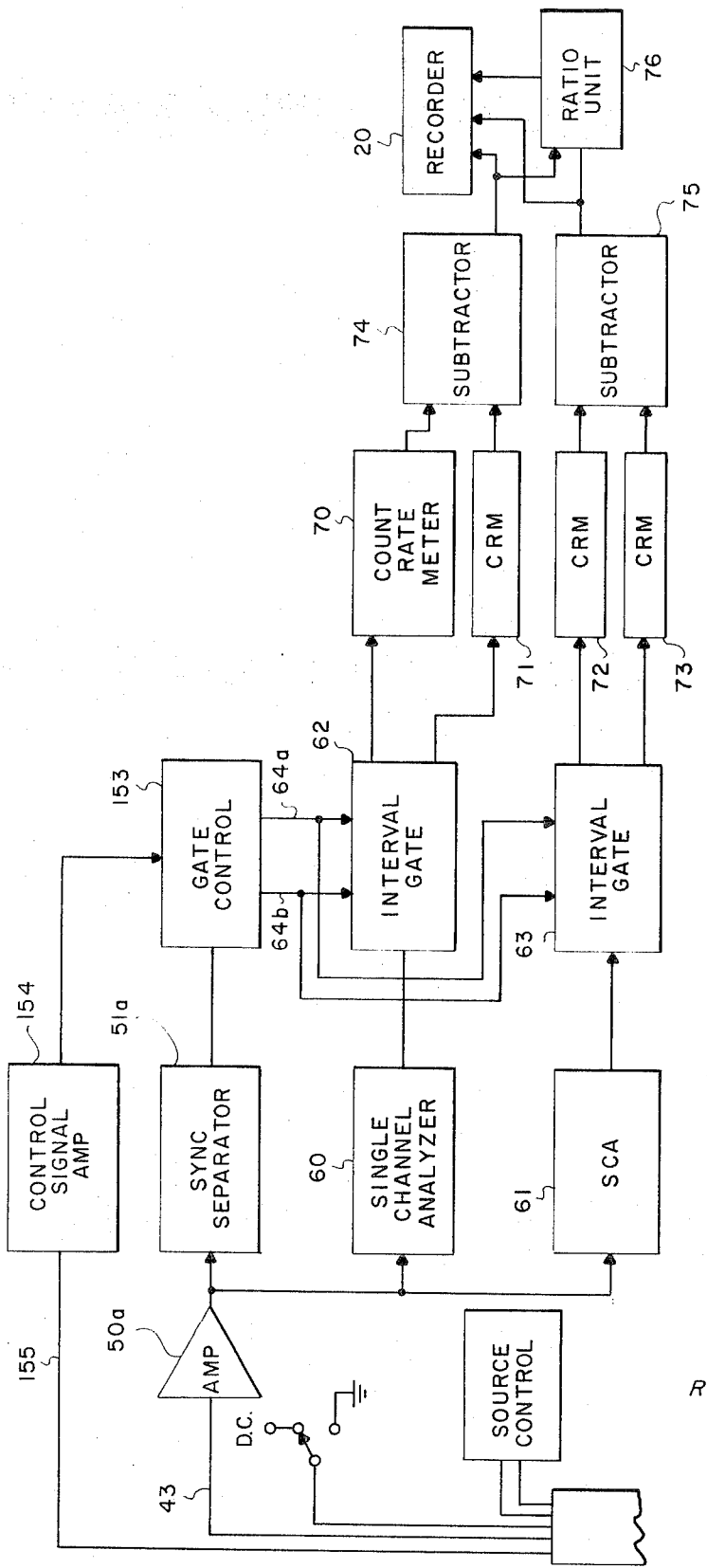
FIG. 4A is a block diagram of an alternative embodiment of the surface electronics according to the invention.

Referring now to FIG. 4A, the sync signals are separated from the detector signals in the sync separator 51a and the divide-by-22 output is amplified and shaped in the control signal amplifier 154. These two signals are then combined in the gate control circuit 153 to provide the control signals for the interval gates, linear gate and/or multichannel analyzer in a manner similar to that described with respect to FIG. 4.

The capture gamma ray data are recorded during the first 11 milliseconds of the cycle. Only the detected pulses occurring in the time interval from 50 microseconds to 1,000 microseconds after each neutron burst beginning with the second burst of each cycle are recorded. That is, all the gamma ray pulses produced during the first 1,000 microsecond interval of the cycle and those in the first 50 microseconds after each subsequent neutron burst are excluded from the measurement.

A second recording interval, illustrated in FIG. 5B, begins 12 milliseconds into the cycle and lasts for 9.5 milliseconds, ending at point H. All gamma ray pulses from this interval are recorded.

Thus, gamma ray pulses from two intervals, each effectively 9.5 milliseconds long are recorded. The data in the first recording interval are from neutron capture and neutron activation reactions; the data from the second recording interval are from neutron inelastic scattering, neutron capture and neutron activation. The data from the two intervals may be processed as previously described.

Since the lifetime of most formation encountered in well logging is less than 1,000 microseconds, excluding pulses produced in the time 0 to 1,000 microseconds allows time for neutrons from each cycle to die away before measurement begins in the subsequent cycle. Also, the exclusion of those pulses produced in the interval of 11,000 microseconds to 12,000 microseconds allows the equilibrium condition to be reached before measurement is begun in the last half of the cycle.

Considering now the overall operation of the source 14 of FIGS. 6 or 7 in conjunction with the circuitry of FIG. 4, it should be appreciated that the detection intervals are, as measured from a time zero sync pulse, such that the first detection interval covers the 50–1,000 microsecond area. The second detection interval covers the 1,450–2,400 microsecond area. This arrangement causes the first detection interval to follow the pulsed burst of neutrons, which thus causes it to measure the capture gamma rays occurring during that interval. The second detection interval occurs during the steady state interval, which thus causes the second interval to include the capture gamma rays plus those due to the inelastic scattering of fast neutrons.

Referring again to FIG. 4, the CRM 70 counts the number of carbon energy capture gamma rays occurring in the first interval. The CRM 71 counts the number of carbon energy capture gamma rays plus the number of carbon energy gamma rays due to inelastic scattering occurring during the second detection interval. Thus, the subtraction circuit 74 and recorder 20 provide an indication of carbon in the formation of interest.

Likewise, the subtraction circuit 75 and recorder 20 provide an indication of oxygen in the formation of interest, and the ratio unit 76 provides a ratio of the carbon/oxygen indications.

While carbon and oxygen have been described as being primarily of interest, the single channel analyzers can be set at different energy levels for other elements. For example, if gamma rays of 1.8 mev are detected, then the derived measurement will be sensitive to silicon.

Furthermore, while the preferred embodiment of the invention contemplates the use of a single fast neutron source which itself can be periodically switched between its pulsed and continuous modes, those in the art will appreciate that a pair of sources can be used, wherein one of the souces is pulsed and the other is continuous. If desired, the intermittent shielding of a neutron-emitting target such as beryllium or boron from a source of alpha particles such as actinium, radium or polonium, all as is described in U. S. Pat. No. 3,379,884 to A. H. Youmans, issued Apr. 23, 1968, and assigned to the assignee of the present invention, can be used to provide either the pulsed or the continuous source, or both.

Alternatively, a disk with alternately short and long "windows" having synchronization with appropriate normalized detection intervals can cause the formations to be subjected to a periodic pulsed/continuous irradiation by fast neutrons. Furthermore, while not nearly so desirable, the invention could be practiced by combining two logs; one from a pulsed source and a detector arranged to measure during the quiescent interval beginning immediately after the source ceases to emit, and one from a continuous source and detector.

It should likewise be appreciated by those in the art that the "continuous" mode as described herein can be characterized as being periodic "long pulses." However, the term "continuous" or "steady state" has been employed because the emission time is quite long compared to that of the fast neutron interactions being measured.

Again, while the activation reactions have not been discussed at length herein, the counts from activation gamma rays will be equal in the two detection intervals and hence be canceled out in the subtraction circuitry, even if the measurements are made with a staionary instrument.

It should also be appreciated by those in the art that detection circuitry such as is described in the said U.S. Pat. No. 3,379,884 can also be used in the borehole instrument to measure the rate of the decline of the thermal neutron population following the short bursts of neutrons described herein, in addition to the other measurements relating to the derivation of an indication of inelastic scatter gamma rays.

The embodiments of the invention in which an exclusive property or privilege is claimed are defined as follows:

1. The method of well logging comprising the steps of:
   irradiating the formations surrounding a well with a first discrete pulse of high energy neutrons, said first pulse being of a first duration;
   detecting radiations emanating from said irradiated formations following said first pulse;
   irradiating the formations surrounding said well with a second discrete pulse of high energy neutrons, said second pulse being of a second duration substantially longer than that of said first pulse;
   detecting radiations emanating from said irradiated formations during a portion of said second pulse; and
   establishing an electrical signal functionally related to the difference in number between the detected radiations following said first pulse and the detected radiations during a portion of said second pulse.

2. The method according to claim 1 including the additional step of recording said electrical signal as a function of depth in the well bore.

3. The method of well logging comprising the steps of:

irradiating the formations surrounding a well with a first discrete pulse of high energy neutrons, said first pulse being of a first duration and having a given number of such neutrons;

detecting radiations emanating from said irradiated formations following said first pulse;

irradiating said formations with a second discrete pulse of high energy neutrons, said second pulse being of a second duration substantially longer than that of said first pulse and having substantially at least as many of such high energy neutrons as said given number;

detecting radiations emanating from said irradiated formations during a portion of said second pulse having substantially the same number of high energy neutrons as said given number; and establishing an electrical signal functionally related to the difference in number between the detected radiations following said first pulse and the detected radiations during a portion of said second pulse.

4. The method according to claim 3 including the additional step of recording said electrical signal as a function of depth in the well bore.

5. The method of well logging comprising the steps of:

irradiating the formations surrounding a well with a plurality of discrete pulses of high energy neutrons, each of said pulses each having a given duration and a given number of such neutrons;

detecting radiations emanating from said irradiated formations following said plurality of pulses, respectively;

irradiating said formations with a longer discrete pulse of high energy neutrons, said longer pulse having substantially at least as many of such high energy neutrons as the total of said plurality of discrete pulses;

detecting radiations emanating from said irradiated formations during a portion of said longer pulse; and establishing an electrical signal functionally related to the difference in number between the total detected radiations following said pulrality of pulses and the detected radiations occurring during a portion of said longer pulse.

6. The method according to claim 5 including the additional step of recording said electrical signal as a function of depth in the well bore.

7. The method according to claim 6 wherein said portion of said longer pulse has substantially the same number of high energy neutrons as does the total of said plurality of pulses.

8. The method of well logging comprising the steps of:

irradiating the formations surrounding a well with a plurality of discrete pulses of high energy neutrons, said pulses together having a given number of such neutrons and together having a given total duration;

detecting radiations emanating from said irradiated formations following said plurality of pulses, respectively;

irradiating said formations with a longer discrete pulse of high energy neutrons, said longer pulse having substantially at least as many of such high energy neutrons as the total of said plurality of discrete pulses;

detecting radiations emanating from said irradiated formations during a portion of said longer pulse; and establishing an electrical signal functionally related to the difference in number between the total detected radiations following said plurality of pulses and the detected radiations occurring during a portion of said longer pulse.

9. The method of well logging comprising the steps of:

irradiating the formations surrounding a well with a first discrete pulse of high energy neutrons, said first pulse being of a first duration;

detecting radiations emanating from said irradiated formations following said first pulse;

establishing a first electrical signal functionally related to those radiations having a first energy level detected following said first pulse;

irradiating said formations with a second discrete pulse of high energy neutrons, said second pulse being of a second duration substantially longer than that of said first pulse;

detecting radiations emanating from said irradiated formations during a portion of said second pulse;

establishing a second electrical signal functionally related to those radiations having said first energy level detected during a portion of said second pulse; and establishing a third electrical signal functionally related to the subtraction of said first signal from said second signal.

10. The method according to claim 9 wherein said first energy level corresponds to the 4.4 mev gamma ray peak of carbon.

11. The method according to claim 9 wherein said first energy level corresponds to the 6.1 mev gamma ray peak of oxygen.

12. The method according to claim 9 wherein said first energy level corresponds to the 6.4 mev gamma ray peak of calcium.

13. The method according to claim 9 wherein said first energy level is one of the energy levels selected from the group consisting of the 5.0 and 7.6 mev gamma ray peaks of iron.

14. The method of well logging comprising the steps of:

irradiating the formations surrounding a well with a first discrete pulse of high energy neutrons, said first pulse being of a first duration;

detecting radiations emanating from said irradiated formations following said first pulse;

establishing a first electrical signal functionally related to those radiations having a first energy level detected following said first pulse;

establishing a second electrical signal functionally related to those radiations having a second energy level detected following said first pulse;

irradiating said formations with a second discrete pulse of high energy neutrons, said second pulse being of a second duration substantially longer than that of said first pulse;

detecting radiations emanating from said irradiated formations during a portion of said second pulse;

establishing a third electrical signal functionally related to those radiations having said first energy level detected during a portion of said second pulse;

establishing a fourth electrical signal functionally related to those radiations having said second energy level detected during said portion of said second pulse; and establishing a fifth electrical signal functionally related to the subtraction of said first signal from said third signal; and establishing a sixth electrical signal functionally related to the subtraction of said second signal from said fourth signal.

15. The method according to claim 14 wherein said first energy level corresponds to the 4.4 mev gamma ray peak of carbon and said second energy level corresponds to the 6.1 mev gamma ray peak of oxygen.

16. The method according to claim 14 including the additional step of establishing a seventh electrical signal functionally related to the ratio of said fifth and sixth electrical signals.

17. The method of well logging comprising the steps of:

irradiating the formations surrounding a well with a plurality of discrete pulses of high energy neutrons, each of said pulses each having a given duration and a given number of such neutrons;

detecting radiations emanating from said irradiated formations following said plurality of pulses, respectively;

establishing a first electrical signal functionally related to those radiations having a first energy level detected following said plurality of pulses;

irradiating said formations with a longer discrete pulse of high energy neutrons, said longer pulse having substantially at least as many of such high energy neutrons as the total of said plurality of discrete pulses;

detecting radiations emanating from said irradiated formations during a portion of said longer pulse;

establishing a second electrical signal functionally related to those radiations having said first energy level detected during a portion of said second pulse; and establishing a third electrical signal functionally related to the subtraction of said first signal from said second signal.

18. The method according to claim 17 wherein said first energy level corresponds to the 4.4 mev gamma ray peak of carbon.

19. The method according to claim 17 wherein said first energy level corresponds to the 6.1 mev gamma ray peak of oxygen.

20. The method according to claim 17 wherein said first energy level corresponds to the 6.4 mev gamma ray peak of calcium.

21. The method according to claim 17 wherein said first energy level is one of the energy levels selected from the group consisting of the 5.0 and 7.6 mev gamma ray peaks of iron.

22. The method of well logging comprising the steps of:

irradiating the formations surrounding a well with a plurality of discrete pulses of high energy neutrons, each of said pulses having a given duration and a given number of such neutrons;

detecting radiations emanating from said irradiated formations following said plurality of pulses, respectively;

establishing a first electrical signal functionally related to those radiations having a first energy level detected following said plurality of pulses;

establishing a second electrical signal functionally related to those radiation having a second energy level detected following said plurality of pulses;

irradiating said formations with a longer discrete pulse of high energy neutrons, said longer pulse being of a duration substantially longer than that of the total of said plurality of pulses and having substantially at least as many of such neutrons as the total of said pulses;

detecting radiations emanating from said irradiated formations during a portion of said longer pulse;

establishing a third electrical signal functionally related to those radiations having said first energy level detected during a portion of said longer pulse;

establishing a fourth electrical signal functionally related to those radiations having said second energy level detected during said portion of said longer pulse; and establishing a fifth electrical signal functionally related to the subtraction of said first signal from said third signal; and establishing a sixth electrical signal functionally related to the subtraction of said second signal from said fourth signal.

23. The method according to claim 22 wherein said first energy level corresponds to the 4.4 mev gamma ray peak of carbon and said second energy level corresponds to the 6.1 mev gamma ray peak of oxygen.

24. The method according to claim 22 including the additional step of establishing a seventh electrical signal functionally related to the ratio of said fifth and sixth electrical signals.

25. A radioactivity well logging apparatus, comprising:

a source of pulsed neutrons adapted to be passed through a borehole adjacent the formations of interest;

a continuous source of neutrons adapted to be passed through said borehole; and means for periodically switching between said pulsed and said continuous sources of neutrons, whereby said formations are alternately irradiated by such pulsed and continuous sources.

26. A radioactivity well logging apparatus, comprising:

a first source of pulsed neutrons adapted to be passed through a borehole adjacent the formations of interest, said pulses each having a given duration;

a second source of longer pulsed neutrons adapted to be passed through said borehole, said longer pulses having a duration substantially longer than the duration of the pulses of said first source and having substantially at least as many neutrons as do the pulses of said first source; and means for causing said first and second sources to alternately irradiate said formations.

27. The well logging apparatus according to claim 26 wherein each of said sources emit a single pulse prior to switching to the other source.

28. The well logging apparatus according to claim 26 wherein said first source emits a plurality of pulses prior to switching to the continuous mode of operation.

29. The apparatus according to claim 26 wherein said first and said second sources of neutrons comprise a single source of high energy neutrons.

30. In a radioactivity well logging system having a neutron source, the improvement comprising means to first pulse the formations surrounding the borehole with a first pulse of high energy neutrons having a given time duration and a given number of such neutrons and then to pulse the formations with a second pulse of high energy neutrons having a time duration longer than said given time duration and having substantially at least as many high energy neutrons as said given number.

31. In the system according to claim 30, including in addition thereto, means for separating said first and second pulses by a quiescent period substantially equal to a portion of said second pulse having as mahy high energy neutrons as does said first pulse.

32. In a radioactivity well logging system having a neutron source, the improvement comprising means to first pulse the formations surrounding the borehole with a plurality of high energy neutron pulses, said pulses together having a given time duration and a given number of such neutrons, and then to pulse the formations with a single pulse of high energy neutrons having a time duration longer than said given time duration and having substantially at least as many high energy neutrons as said given number.

* * * * *